United States Patent
Wu et al.

(10) Patent No.: US 12,160,584 B2
(45) Date of Patent: Dec. 3, 2024

(54) VIDEO ENCODING APPARATUS FOR PERFORMING VIDEO COMPRESSION WITH AID OF CONTENT ACTIVITY ANALYSIS AND ASSOCIATED VIDEO ENCODING METHOD

(71) Applicant: MEDIATEK INC., Hsin-Chu (TW)

(72) Inventors: Tung-Hsing Wu, Hsinchu (TW); Ping-Han Lee, Hsinchu (TW); Tzu-Yun Tseng, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 17/892,139

(22) Filed: Aug. 22, 2022

(65) Prior Publication Data

US 2023/0217027 A1 Jul. 6, 2023

Related U.S. Application Data

(60) Provisional application No. 63/296,172, filed on Jan. 4, 2022.

(51) Int. Cl.
*H04N 11/02* (2006.01)
*H04N 19/14* (2014.01)
(Continued)

(52) U.S. Cl.
CPC ........... *H04N 19/14* (2014.11); *H04N 19/172* (2014.11); *H04N 19/182* (2014.11)

(58) Field of Classification Search
CPC ..... H04N 19/14; H04N 19/172; H04N 19/182
(Continued)

(56) References Cited

U.S. PATENT DOCUMENTS

| 8,774,272 B1* | 7/2014 | Chen | H04N 19/149 |
| | | | 375/240.12 |
| 2004/0240546 A1* | 12/2004 | Wells | H04N 7/181 |
| | | | 348/E7.086 |

(Continued)

FOREIGN PATENT DOCUMENTS

| CN | 107659827 A | 2/2018 |
| TW | 515199 | 12/2002 |
| TW | 201813383 A | 4/2018 |

OTHER PUBLICATIONS

"International Search Report" mailed on Apr. 20, 2023 for International application No. PCT/CN2023/070087, International filing date: Jan. 3, 2023.

*Primary Examiner* — Jayanti K Patel
*Assistant Examiner* — Richard B Carter
(74) *Attorney, Agent, or Firm* — Winston Hsu (57) ABSTRACT

A video encoding apparatus includes a content activity analyzer circuit and a video encoder circuit. The content activity analyzer circuit applies a content activity analysis process to consecutive frames, to generate content activity analysis results. The consecutive frames are derived from input frames of the video encoding apparatus. The content activity analysis process includes: deriving a first content activity analysis result according to a first frame and a second frame in the consecutive frames, wherein the first content activity analysis result includes a processed frame distinct from the second frame; and deriving a second content activity analysis result according to a third frame included in the consecutive frames and the processed frame. The video encoder circuit performs a video encoding process to generate a bitstream output of the video encoding apparatus, wherein information derived from the content activity analysis results is referenced by the video encoding process.

18 Claims, 8 Drawing Sheets

(51) Int. Cl.
*H04N 19/172* (2014.01)
*H04N 19/182* (2014.01)

(58) Field of Classification Search
USPC ............... 375/240.02, 240.12; 382/107;
348/E7.086
See application file for complete search history.

(56) References Cited

U.S. PATENT DOCUMENTS

| | | |
|---|---|---|
| 2006/0204113 A1 | 9/2006 | Wang |
| 2016/0110877 A1* | 4/2016 | Schwartz ............... G06F 16/48 382/107 |
| 2018/0302627 A1* | 10/2018 | Larbier ............... H04N 19/132 |
| 2020/0120342 A1 | 4/2020 | Zhang |
| 2020/0193609 A1* | 6/2020 | Dharur ................... G06T 7/143 |
| 2020/0380261 A1 | 12/2020 | Chandran |

* cited by examiner

VIDEO ENCODING APPARATUS FOR PERFORMING VIDEO COMPRESSION WITH AID OF CONTENT ACTIVITY ANALYSIS AND ASSOCIATED VIDEO ENCODING METHOD

CROSS REFERENCE TO RELATED APPLICATIONS

This application claims the benefit of U.S. Provisional Application No. 63/296,172, filed on Jan. 4, 2022. The content of the application is incorporated herein by reference.

BACKGROUND

The present invention relates to video compression, and more particularly, to a video encoding apparatus for performing video compression (e.g. low bit-rate video compression) with the aid of content activity analysis and an associated video encoding method.

One of the recent targets in mobile telecommunications is to increase the speed of data transmission to enable incorporation of multimedia services to mobile networks. One of the key components of multimedia is digital video. Transmission of digital video includes a continuous traffic of data. In general, the amount of data needed by digital video is high compared with many other types of media. Thus, there is a need for an innovative method and apparatus for low bit-rate video compression.

SUMMARY

One of the objectives of the claimed invention is to provide a video encoding apparatus for performing video compression (e.g. low bit-rate video compression) with the aid of content activity analysis and an associated video encoding method.

According to a first aspect of the present invention, an exemplary video encoding apparatus is disclosed. The exemplary video encoding apparatus includes a content activity analyzer circuit and a video encoder circuit. The content activity analyzer circuit is arranged to apply a content activity analysis process to a plurality of consecutive frames, to generate a plurality of content activity analysis results, wherein the plurality of consecutive frames are derived from a plurality of input frames of the video encoding apparatus, and the content activity analysis process performed by the content activity analyzer circuit comprises: deriving a first content activity analysis result included in the plurality of content activity analysis results according to a first frame and a second frame included in the plurality of consecutive frames, wherein the first content activity analysis result comprises a processed frame distinct from the second frame; and deriving a second content activity analysis result included in the plurality of content activity analysis results according to a third frame included in the plurality of consecutive frames and the processed frame. The video encoder circuit is arranged to perform a video encoding process to generate a bitstream output of the video encoding apparatus, wherein information derived from the plurality of content activity analysis results is referenced by the video encoding process.

According to a second aspect of the present invention, an exemplary video encoding method is disclosed. The exemplary video encoding method includes: applying a content activity analysis process to a plurality of consecutive frames for generating a plurality of content activity analysis results, and performing a video encoding process to generate a bitstream output. The plurality of consecutive frames are derived from a plurality of input frames. The content activity analysis process comprises: deriving a first content activity analysis result included in the plurality of content activity analysis results according to a first frame and a second frame included in the plurality of consecutive frames, wherein the first content activity analysis result comprises a processed frame distinct from the second frame; and deriving a second content activity analysis result included in the plurality of content activity analysis results according to a third frame included in the plurality of consecutive frames and the processed frame. Information derived from the plurality of content activity analysis results is referenced by the video encoding process These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
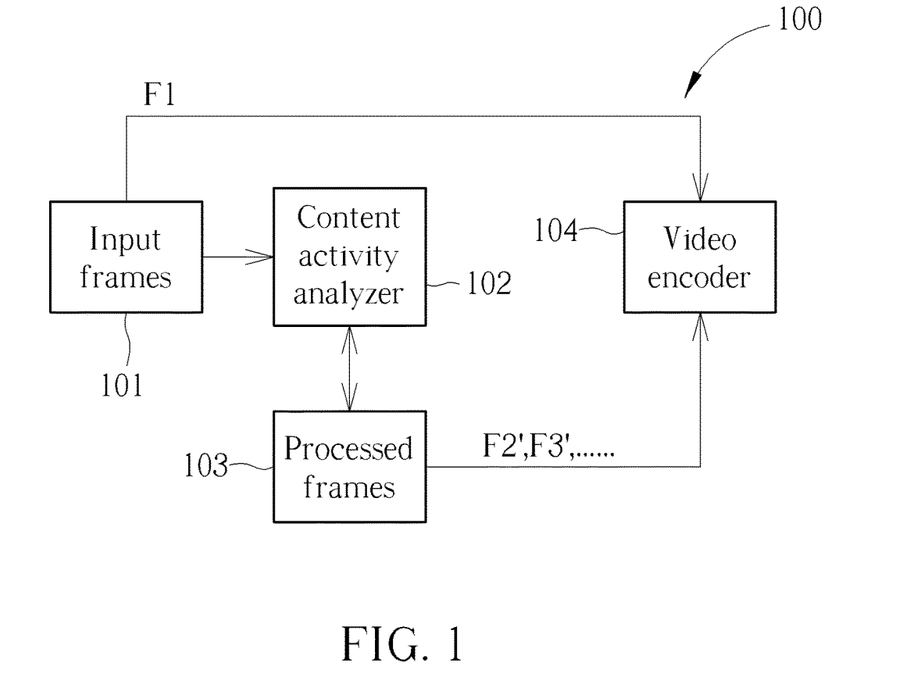
FIG. 1 is a diagram illustrating a first video encoding apparatus according to an embodiment of the present invention.

FIG. 1 is a diagram illustrating a first video encoding apparatus according to an embodiment of the present invention. The video encoding apparatus 100 includes a content activity analyzer circuit (labeled by "content activity analyzer") 102 and a video encoder circuit (labeled by "video encoder") 104. The content activity analyzer circuit 102 is arranged to apply a content activity analysis process to consecutive frames, to generate content activity analysis results. In this embodiment, the consecutive frames received by the content activity analyzer circuit 102 are input frames 101 of the video encoding apparatus 100, and the content activity analysis results generated by the content activity analyzer circuit 102 are processed frames 103. It should be noted that, in accordance with the proposed content activity analysis process, a previous processed frame 103 generated for a previous input frame 101 may be referenced by the content activity analyzer circuit 102 for content activity analysis of a current input frame 101.

Figure 2:
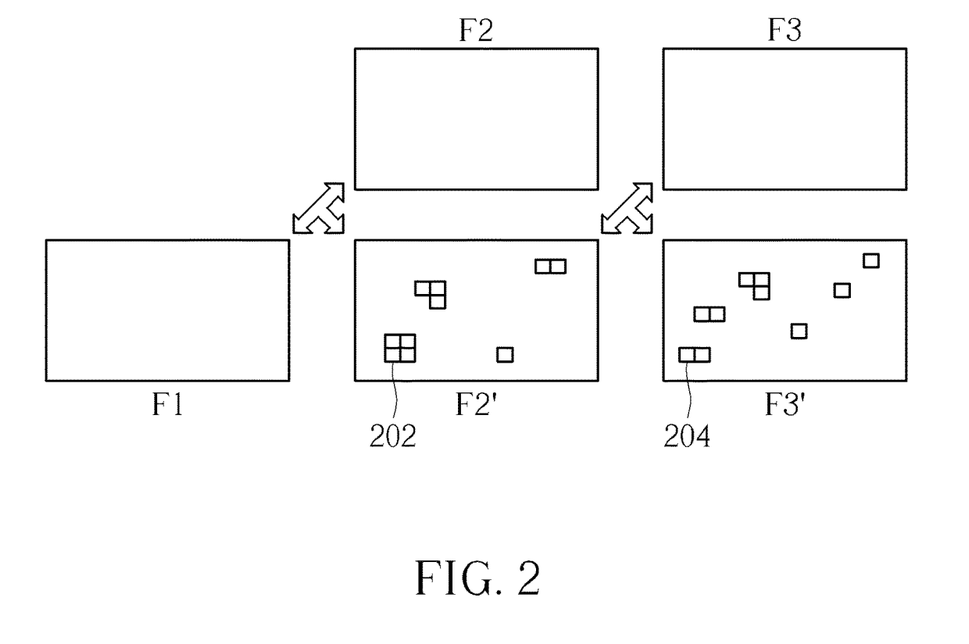
FIG. 2 is a diagram illustrating a content activity analysis process according to an embodiment of the present invention.

FIG. 2 is a diagram illustrating a content activity analysis process according to an embodiment of the present invention. The input frames 101 include consecutive frames such as frames F1, F2, and F3. The content activity analyzer circuit 102 derives a processed frame F2' from the input frames F1 and F2. Specifically, the content activity analyzer circuit 102 performs content activity analysis of pixel data of input frames F1 and F2 to identify static pixel data in the input frame F2, where the static pixel data means that there is no motion activity between a current frame (i.e. input frame F2) and a previous frame (i.e. input frame F1). In addition, the content activity analyzer circuit 102 derives processed pixel data 202, and generates the processed frame F2' by replacing the static pixel data identified in the input frame F2 with the processed pixel data 202. For example, the processed pixel data 202 is static pixel data in the input frame F1. For another example, the processed static pixel data 202 is generated by applying an arithmetic operation to pixel data in the input frames F1 and F2. With the help of the processed pixel data 202 in the processed frame F2', the complexity of encoding the processed frame F2' can be reduced, resulting in a low bit-rate bitstream.

The processed frame F2' is distinct from the input frame F2, and may be used as a substitute of the input frame F2 for following content activity analysis. Compared to content activity analysis of pixel data of input frames F3 and F2, content activity analysis of pixel data of input frame F3 and processed frame F2' can produce a more accurate static pixel data detection result. As shown in FIG. 2, the content activity analyzer circuit 102 derives a processed frame F3' from the input frame F3 and the processed frame F2'. Specifically, the content activity analyzer circuit 102 performs content activity analysis of pixel data of input frame F3 and processed frame F2' to identify static pixel data in the input frame F3, where the static pixel data means that there is no motion activity between a current frame (i.e. input frame F3) and a previous frame (i.e. processed frame F2'). In addition, the content activity analyzer circuit 102 derives processed pixel data 204, and generates the processed frame F3' by replacing the static pixel data identified in the input frame F3 with the processed pixel data 204. For example, the processed pixel data 204 is static pixel data in the processed frame F2'. For another example, the processed static pixel data 204 is generated by applying an arithmetic operation to pixel data in the input frame F3 and processed frame F2'. With the help of the processed pixel data 204 in the processed frame F3', the complexity of encoding the processed frame F3' can be reduced, resulting in a low bit-rate bitstream. Similarly, the processed frame F3' is distinct from the input frame F3, and may be used as a substitute of the input frame F3 for following content activity analysis. Similar description is omitted here for brevity.

The video encoder circuit 104 is arranged to perform a video encoding process to generate a bitstream output of the video encoding apparatus 100, wherein information derived from the content activity analysis results (e.g. processed frames 103) is referenced by the video encoding process. In this embodiment, the video encoder circuit 104 encodes the input frame F1 to generate a first frame bitstream included in the bitstream output, encodes the processed frame F2' to generate a second frame bitstream included in the bitstream output, encodes the processed frame F3' to generate a third frame bitstream included in the bitstream output, and so forth. It should be noted that the video encoder circuit 104 may be implemented by any suitable encoder architecture. That is, the present invention has no limitations on the encoder architecture employed by the video encoder circuit 104.

Figure 3:
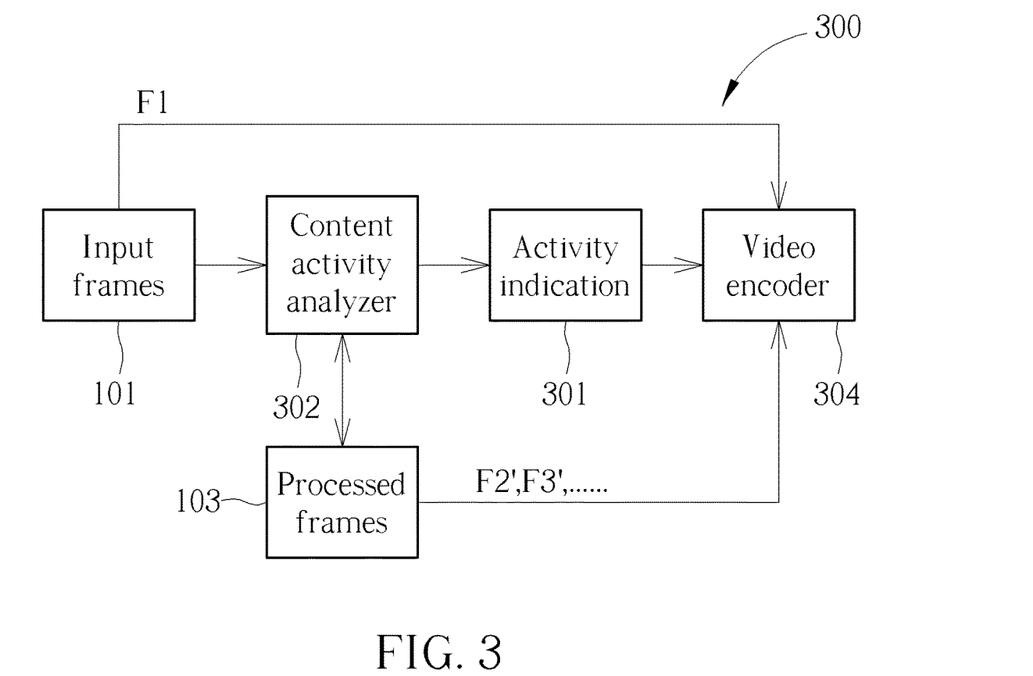
FIG. 3 is a diagram illustrating a second video encoding apparatus according to an embodiment of the present invention.

FIG. 3 is a diagram illustrating a second video encoding apparatus according to an embodiment of the present invention. The video encoding apparatus 300 includes a content activity analyzer circuit (labeled by "content activity analyzer") 302 and a video encoder circuit (labeled by "video encoder") 304. Like the content activity analyzer circuit 102, the content activity analyzer circuit 302 is arranged to apply a content activity analysis process to consecutive frames, to generate content activity analysis results. In this embodiment, the consecutive frames received by the content activity analyzer circuit 302 are input frames 101 of the video encoding apparatus 300. The difference between the content activity analyzer circuits 302 and 102 is that the content activity analysis results generated by the content activity analyzer circuit 302 include processed frames 103 and activity indication 301. Since the principles of generating the processed frames 103 are described above with reference to FIG. 2, further description is omitted here for brevity. In some embodiments of the present invention, the activity indication 301 may be generated after the processed frames 103 are derived from content activity analysis of the input frames 101. The generation of the activity indication 301 depends on the content activity analysis applied to the input frames 101. In other words, the activity indication 301 may be a byproduct of the content activity analysis process performed by the content activity analyzer circuit 302. For example, the activity indication 301 may include a plurality of activity indication maps, each recording one activity indication for each of a plurality of blocks of pixels.

Figure 4:
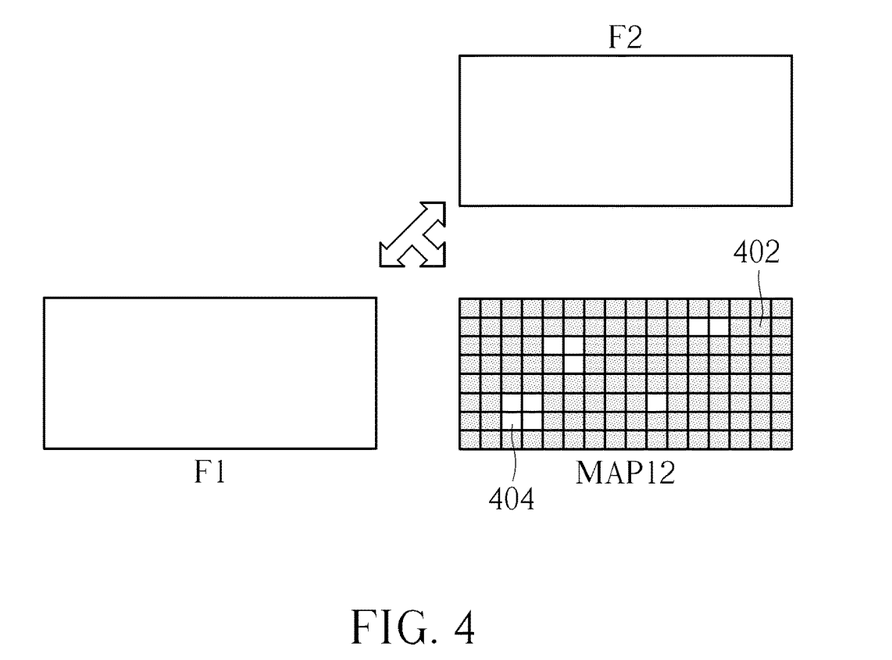
FIG. 4 is a diagram illustrating 2-mode activity indication derived from consecutive frames (e.g. two input frames, or one input frame and one processed frame) according to an embodiment of the present invention.

FIG. 4 is a diagram illustrating 2-mode activity indication derived from consecutive frames (e.g. two input frames, or one input frame and one processed frame) according to an embodiment of the present invention. As shown in FIG. 4, the content activity analyzer circuit 302 may perform content activity analysis of pixel data in the input frames F1 and F2 to generate an activity indication map MAP12 that is a 2-mode activity indication map including static pixel data indication 402 and non-static pixel data indication 404, where each static pixel data indication 402 means no motion activity between co-located blocks in input frames F1 and F2, and the non-static pixel data indication 404 means motion activity between co-located blocks in input frames F1 and F2. Alternatively, the input frames F1 and F2 shown in FIG. 4 may be replaced with an input frame (e.g. F3) and a processed frame (e.g. F2'), such that a 2-mode activity indication map is derived from content activity analysis of pixel data in the input frame and the processed frame. Since a block-based video encoding process is employed by the video encoder circuit 304, the activity indication 301 generated from the content activity analyzer circuit 302 may be block-based activity indication. For example, each static pixel data indication 402 represented by one square in FIG. 4 may indicate static activity of a block of pixels, and each non-static pixel data indication 404 represented by one square in FIG. 4 may indicate motion (non-static) activity of a block of pixels.

Figure 5:
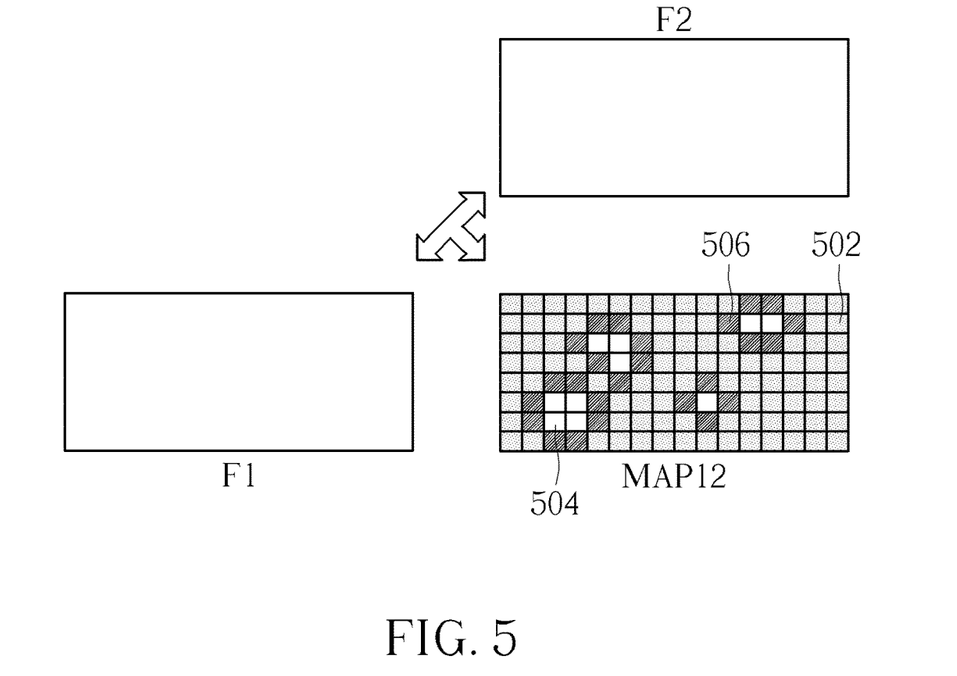
FIG. 5 is a diagram illustrating 3-mode activity indication derived from consecutive frames (e.g. two input frames, or one input frame and one processed frame) according to an embodiment of the present invention.

FIG. 5 is a diagram illustrating 3-mode activity indication derived from consecutive frames (e.g. two input frames, or one input frame and one processed frame) according to an embodiment of the present invention. As shown in FIG. 5, the content activity analyzer circuit 302 may perform content activity analysis of pixel data in the input frames F1 and F2 to generate an activity indication map MAP12 that is a 3-mode activity indication map including static pixel data indication 502, non-static pixel data indication 504, and contour of motion (or static) pixel data indication 506, where the static pixel data indication 502 means no motion activity between co-located blocks in input frames F1 and F2, the non-static pixel data indication 504 means motion activity between co-located blocks in input frames F1 and F2, and the contour of motion (or static) pixel data indication 506 means the contour of motion activity between input frames F1 and F2. It should be noted that the contour of motion (or static) pixel data indication 506 maybe regarded as a guard ring between motion pixel data (non-static pixel data) and static pixel data. Hence, the terms "contour of motion pixel data indication" and "contour of static pixel data indication" may be interchangeable.

Alternatively, the input frames F1 and F2 shown in FIG. 5 may be replaced with an input frame (e.g. F3) and a processed frame (e.g. F2'), such that a 3-mode activity indication map is derived from content activity analysis of pixel data in the input frame and the processed frame. Since a block-based video encoding process is employed by the video encoder circuit 304, the activity indication 301 generated from the content activity analyzer circuit 302 may be block-based activity indication. For example, each static pixel data indication 502 represented by one square in FIG. 5 may indicate static activity of a block of pixels, each non-static pixel data indication 504 represented by one square in FIG. 5 may indicate motion (non-static) activity of a block of pixels, and each contour of motion (or static) pixel data indication 506 represented by one square may correspond to a block of pixels at the boundary between motion pixel data (non-static pixel data) and static pixel data.

The video encoder circuit 304 is arranged to perform a video encoding process to generate a bitstream output of the video encoding apparatus 300, wherein information derived from the content activity analysis results (e.g. processed frames 103 and activity indication 301) is referenced by the video encoding process. In this embodiment, the video encoder circuit 304 encodes the input frame F1 to generate a first frame bitstream included in the bitstream output, encodes the processed frame F2' according to the activity indication 301 (particularly, activity indication map derived from input frames F2 and F1), to generate a second frame bitstream included in the bitstream output, encodes the processed frame F3' according to the activity indication 301 (particularly, activity indication map derived from input frame F3 and processed frame F2'), to generate a third frame bitstream included in the bitstream output, and so forth.

Regarding 2-mode activity indication, it will give two different instructions to the video encoder circuit 304. For example, a plurality of 2-mode activity indication maps are associated with the processed frames 103, respectively. That is, a 2-mode activity indication map associated with a current processed frame to be encoded by the video encoder 304 is referenced by the video encoder 304 to determine how to encode each coding unit (coding block) within the current processed frame. When a coding unit (coding block) in a current processed frame to be encoded is found being associated with the non-static pixel data indication 404 recorded in a 2-mode activity indication map, the video encoder circuit 304 may encode the coding unit (coding block) in a typical manner as specified by a coding standard. When a coding unit (coding block) in a current processed frame to be encoded is found being associated with the static pixel data indication 402 recorded in the 2-mode activity indication map, the video encoder circuit 304 may force a coded motion vector of the coding unit to zero, or may encode the coding unit with a skip mode. However, these are for illustrative purposes only, and are not meant to be limitations of the present invention.

Regarding 3-mode activity indication, it will give three different instructions to the video encoder circuit 304. For example, a plurality of 3-mode activity indication maps are associated with the processed frames 103, respectively. That is, a 3-mode activity indication map associated with a current processed frame to be encoded by the video encoder 304 is referenced by the video encoder 304 to determine how to encode each coding unit (coding block) within the current processed frame. When a coding unit (coding block) in a current processed frame to be encoded is found being associated with the non-static pixel data indication 504 recorded in a 3-mode activity indication map, the video encoder circuit 304 may encode the coding unit (coding block) in a typical manner as specified by a coding standard. When a coding unit (coding block) in a current processed frame to be encoded is found being associated with the static pixel data indication 502 recorded in the 3-mode activity indication map, the video encoder circuit 304 may encode the coding unit with a skip mode. When a coding unit (coding block) in a current processed frame to be encoded is found being associated with the contour of motion (or static) pixel data indication 506, the video encoder circuit 304 may force a coded motion vector of the coding unit to zero, or may encode the coding unit without residual information, or may encode the coding unit with a skip mode. However, these are for illustrative purposes only, and are not meant to be limitations of the present invention.

Compared to the video encoder circuit 104 that encodes each coding unit (coding block) of a processed frame in a typical manner as specified by a coding standard, the video encoder circuit 304 that refers to the activity indication 301 to encode each coding unit (coding block) of a processed frame can make a reconstructed frame (decoded frame) at a decoder side have better image quality. It should be noted that the video encoder circuit 304 may be implemented by any suitable encoder architecture. That is, the present invention has no limitations on the encoder architecture employed by the video encoder circuit 304.

Figure 6:
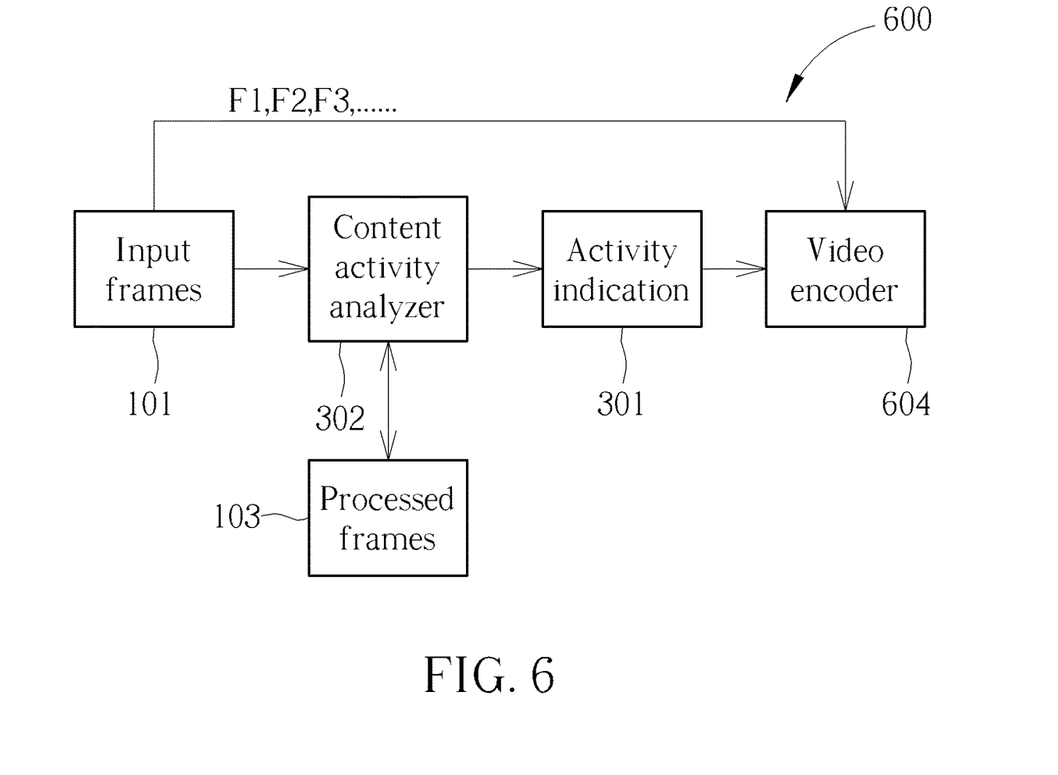
FIG. 6 is a diagram illustrating a third video encoding apparatus according to an embodiment of the present invention.

FIG. 6 is a diagram illustrating a third video encoding apparatus according to an embodiment of the present invention. The video encoding apparatus 600 includes a video encoder circuit (labeled by "video encoder") 604 and the aforementioned content activity analyzer circuit (labeled by "content activity analyzer") 302. The video encoder circuit 604 is arranged to perform a video encoding process to generate a bitstream output of the video encoding apparatus 600, wherein information derived from the content activity analysis results (e.g. activity indication 301) is referenced by the video encoding process. It should be noted that the processed frames 103 generated by the content activity analyzer circuit 302 are used for content activity analysis only, and are not encoded into the output bitstream by the video encoder circuit 604.

In this embodiment, the input frames 101 are encoded with the aid of the activity indication 301. For example, the activity indication 301 may include a plurality of activity indication maps associated with all input frames 101 except the first input frame F1, respectively. In a case where 2-mode activity indication is adopted, the 2-mode activity indication will give two different instructions to the video encoder circuit 604. In another case where 3-mode activity indication is adopted, the 3-mode activity indication will give three different instructions to the video encoder circuit 604. When a coding unit (coding block) in a current input frame to be encoded is found being associated with one activity indication recorded in the 2-mode activity indication map (or 3-mode activity indication map), the video encoder circuit 604 may encode the coding unit (coding block) in a manner as instructed by the activity indication. Hence, the video encoder circuit 604 encodes the input frame F1 to generate a first frame bitstream included in the bitstream output, encodes the input frame F2 according to the activity indication 301 (particularly, activity indication map derived from input frames F2 and F1), to generate a second frame bitstream included in the bitstream output, encodes the input frame F3 according to the activity indication 301 (particularly, activity indication map derived from input frame F3 and processed frame F2'), to generate a third frame bitstream included in the bitstream output, and so forth. It should be noted that the video encoder circuit 604 may be implemented by any suitable encoder architecture. That is, the present invention has no limitations on the encoder architecture employed by the video encoder circuit 604.

In above embodiments, each of the content activity analyzer circuits 102 and 302 performs the content activity analysis process under an image resolution of the input frames 101. For example, the image resolution of each input frame may be 3840×2160. To get better video quality and lower bit-rate, a pre-processing circuit may be introduced to the video encoding apparatus.

Figure 7:
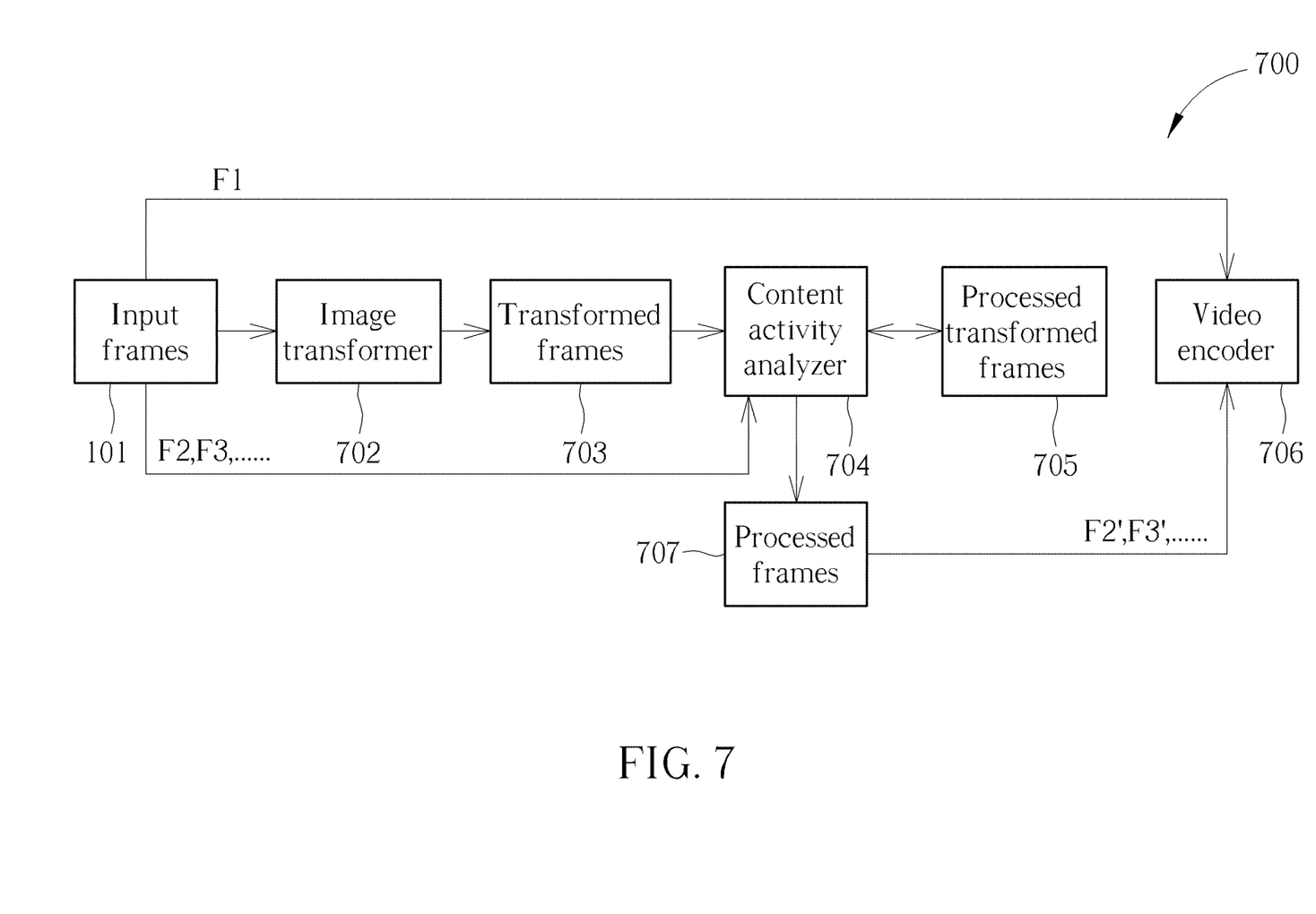
FIG. 7 is a diagram illustrating a fourth video encoding apparatus according to an embodiment of the present invention.

FIG. 7 is a diagram illustrating a fourth video encoding apparatus according to an embodiment of the present invention. The video encoding apparatus 700 includes an image transformer circuit (labeled by "image transformer") 702, a content activity analyzer circuit (labeled by "content activity analyzer") 704 and a video encoder circuit (labeled by "video encoder") 706. The image transformer circuit 702 acts as a pre-processing circuit, and is arranged to apply an image transform process to the input frames 101 of the video encoding apparatus 700, to generate transformed frames 703 as consecutive frames to undergo a content activity analysis process at the content activity analyzer circuit 704. The image transform process may include a down-sampling operation, such that an image resolution (e.g. 960×540) of one transformed frame output from the image transformer circuit 702 is lower than an image resolution (e.g. 3840× 2160) of one input frame received by the image transformer circuit 702. The down-sampling operation can reduce the complexity of the content activity analyzer circuit 704. In addition, the down-sampling operation can reduce the noise level, which makes the content activity analyzer circuit 704 more robust to noise.

The content activity analyzer circuit 704 is arranged to apply a content activity analysis process to consecutive frames, to generate content activity analysis results. In this embodiment, the consecutive frames received by the content activity analyzer circuit 704 are transformed frames 703, and the content activity analysis results generated by the content activity analyzer circuit 704 include processed transformed frames 705 and processed frames 707. The processed transformed frames 705 and the transformed frames 703 may have the same image resolution (e.g. 960×540). The processed frames 707 and the input frames 101 may have the same image resolution (e.g. 3840×2160).

It should be noted that, in accordance with the proposed content activity analysis process, a previous processed transformed frame 705 generated for a previous transformed frame 703 may be referenced by the content activity analyzer circuit 704 for content activity analysis of a current transformed frame, and a current processed frame may be derived from a current input frame and a previous input frame (or a previous processed frame) according to information given from content activity analysis of the current transformed frame and the previous transformed frame (or previous processed transformed frame).

Figure 8:
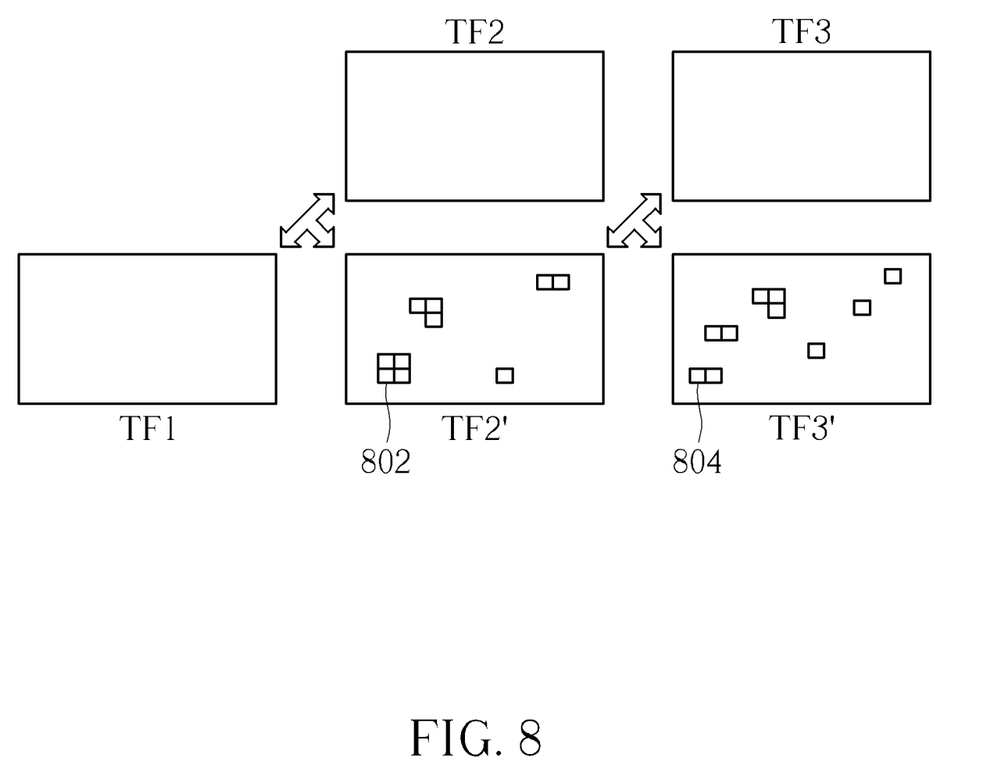
FIG. 8 is a diagram illustrating a post-transform content activity analysis process according to an embodiment of the present invention.

FIG. 8 is a diagram illustrating a post-transform content activity analysis process according to an embodiment of the present invention. The transformed frames 703 include consecutive frames, such as frames TF1, TF2, and TF3 that are derived from input frames F1, F2, and F3 through image transform, respectively. The content activity analyzer circuit 704 derives a processed transformed frame TF2' according to the transformed frames TF1 and TF2. Specifically, the content activity analyzer circuit 704 performs content activity analysis of pixel data of transformed frames TF1 and TF2 to identify static pixel data in the transformed frame TF2, where the static pixel data means that there is no motion activity between a current frame (e.g. transformed frame TF2) and a previous frame (e.g. transformed frame TF1). In addition, the content activity analyzer circuit 704 derives processed pixel data 802, and generates the processed transformed frame TF2' by replacing the static pixel data identified in the transformed frame TF2 with the processed pixel data 802. For example, the processed pixel data 802 is static pixel data in the transformed frame TF1. For another example, the processed static pixel data 802 is generated by applying an arithmetic operation to pixel data in the transformed frames TF1 and TF2.

The processed transformed frame TF2' is distinct from the transformed frame TF2, and may be used as a substitute of the transformed frame TF2 for following content activity analysis. Compared to content activity analysis of pixel data of transformed frames TF3 and TF2, content activity analysis of pixel data of transformed frame TF3 and processed transformed frame TF2' can produce a more accurate static pixel data detection result. As shown in FIG. 8, the content activity analyzer circuit 704 derives a processed transformed frame TF3' according to the transformed frame TF3 and the processed transformed frame TF2'. Specifically, the content activity analyzer circuit 704 performs content activity analysis of pixel data of transformed frame TF3 and processed transformed frame TF2' to identify static pixel data in the transformed frame TF3, where the static pixel data means that there is no motion activity between a current frame (e.g. transformed frame TF3) and a previous frame (e.g. processed transformed frame TF2'). In addition, the content activity analyzer circuit 704 derives processed pixel data 804, and generates the processed transformed frame TF3' by replacing the static pixel data identified in the transformed frame TF3 with the processed pixel data 804. For example, the processed pixel data 804 is static pixel data in the processed transformed frame TF2'. For another example, the processed static pixel data 804 is generated by applying an arithmetic operation to pixel data in the transformed frame TF3 and processed transformed frame TF2'. Similarly, the processed transformed frame TF3' is distinct from the transformed frame TF3, and may be used as a substitute of the transformed frame TF3 for following content activity analysis. Similar description is omitted here for brevity.

As mentioned above, the image resolution of processed frames 707 is higher than that of transformed frames 703 and processed transformed frames 705. With proper scaling and mapping, locations of static pixel data in the input frame F2 can be predicted on the basis of locations of static pixel data identified in the transformed frame TF2. Hence, the content activity analyzer circuit 704 derives processed pixel data, and generates the processed frame F2' by replacing the static pixel data predicted in the input frame F2 with the processed pixel data. For example, the processed pixel data is static pixel data in the input frame F1. For another example, the processed static pixel data is generated by applying an arithmetic operation to pixel data in the input frames F1 and F2.

Similarly, with proper scaling and mapping, locations of static pixel data in the input frame F3 can be predicted on the basis of locations of static pixel data identified in the transformed frame TF3. Hence, the content activity analyzer circuit 704 derives processed pixel data, and generates the processed frame F3' by replacing the static pixel data predicted in the input frame F3 with the processed pixel data. For example, the processed pixel data is static pixel data in the processed frame F2'. For another example, the processed static pixel data is generated by applying an arithmetic operation to pixel data in the input frame F3 and processed frame F2'.

The video encoder circuit 706 is arranged to perform a video encoding process to generate a bitstream output of the video encoding apparatus 700, wherein information derived from the content activity analysis results (e.g. processed frames 707) is referenced by the video encoding process. In this embodiment, the video encoder circuit 706 encodes the input frame F1 to generate a first frame bitstream included in the bitstream output, encodes the processed frame F2' to generate a second frame bitstream included in the bitstream output, encodes the processed frame F3' to generate a third frame bitstream included in the bitstream output, and so forth. It should be noted that the video encoder circuit 706 may be implemented by any suitable encoder architecture. That is, the present invention has no limitations on the encoder architecture employed by the video encoder circuit 706.

Figure 9:
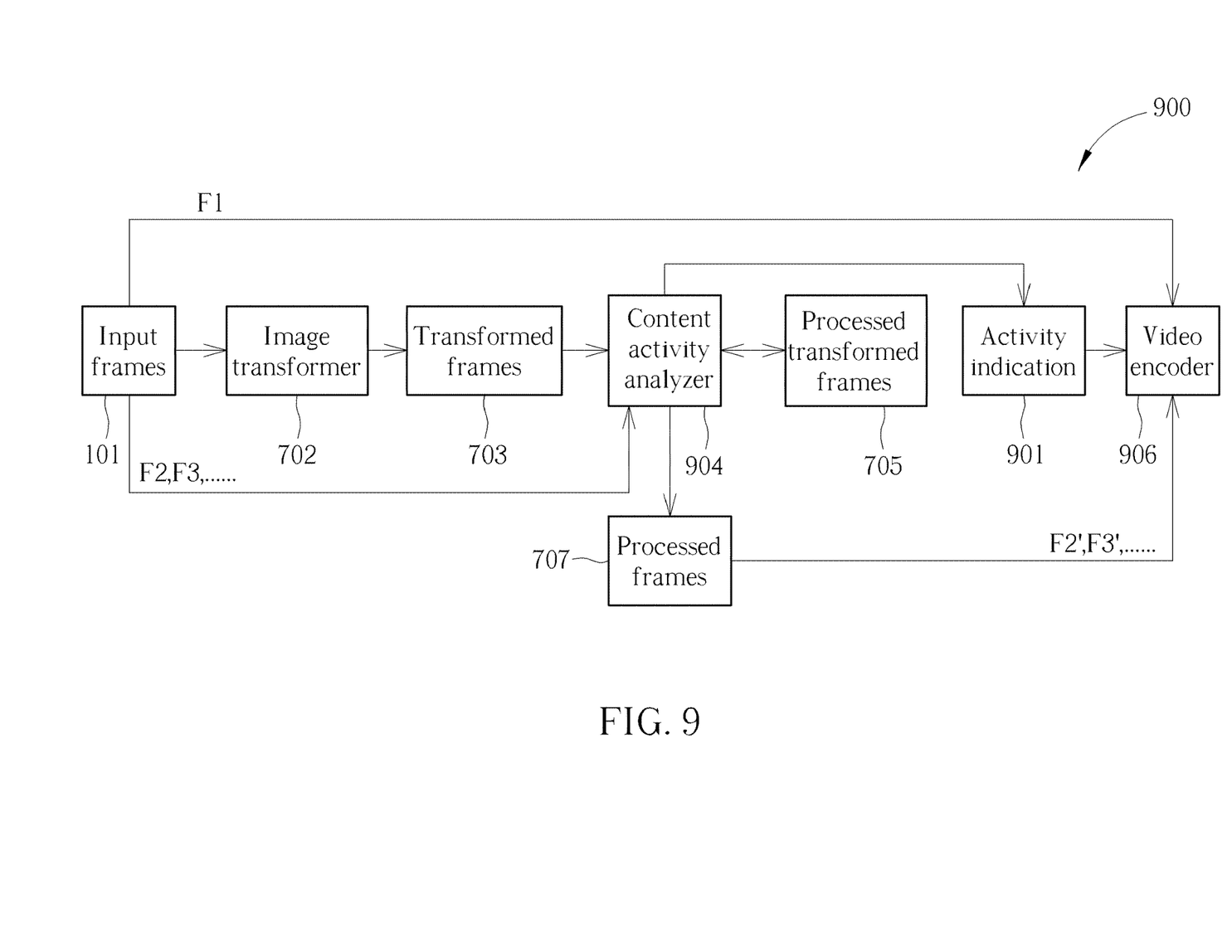
FIG. 9 is a diagram illustrating a fifth video encoding apparatus according to an embodiment of the present invention.

FIG. 9 is a diagram illustrating a fifth video encoding apparatus according to an embodiment of the present invention. The video encoding apparatus 900 includes a content activity analyzer circuit (labeled by "content activity analyzer") 904, a video encoder circuit (labeled by "video encoder") 906, and the aforementioned image transformer circuit (labeled by "image transformer") 702. Like the content activity analyzer circuit 704, the content activity analyzer circuit 904 is arranged to apply a content activity analysis process to consecutive frames, to generate content activity analysis results. In this embodiment, the consecutive frames received by the content activity analyzer circuit 904 are transformed frames 703. The difference between the content activity analyzer circuits 904 and 704 is that the content activity analysis results generated by the content activity analyzer circuit 904 include processed frames 707, processed transformed frames 705, and activity indication 901. Since the principles of generating the processed transformed frames 705 and the processed frames 707 are described in above paragraphs, further description is omitted here for brevity. In some embodiments of the present invention, the activity indication 901 may be generated after the processed transformed frames 705 are derived from content activity analysis of the transformed frames 703. The generation of the activity indication 901 depends on the content activity analysis applied to the transformed frames 703. In other words, the activity indication 901 may be a byproduct of the content activity analysis process performed by the content activity analyzer circuit 904. For example, the activity indication 901 may include a plurality of activity indication maps, each recording one activity indication for each of a plurality of blocks of pixels.

Figure 10:
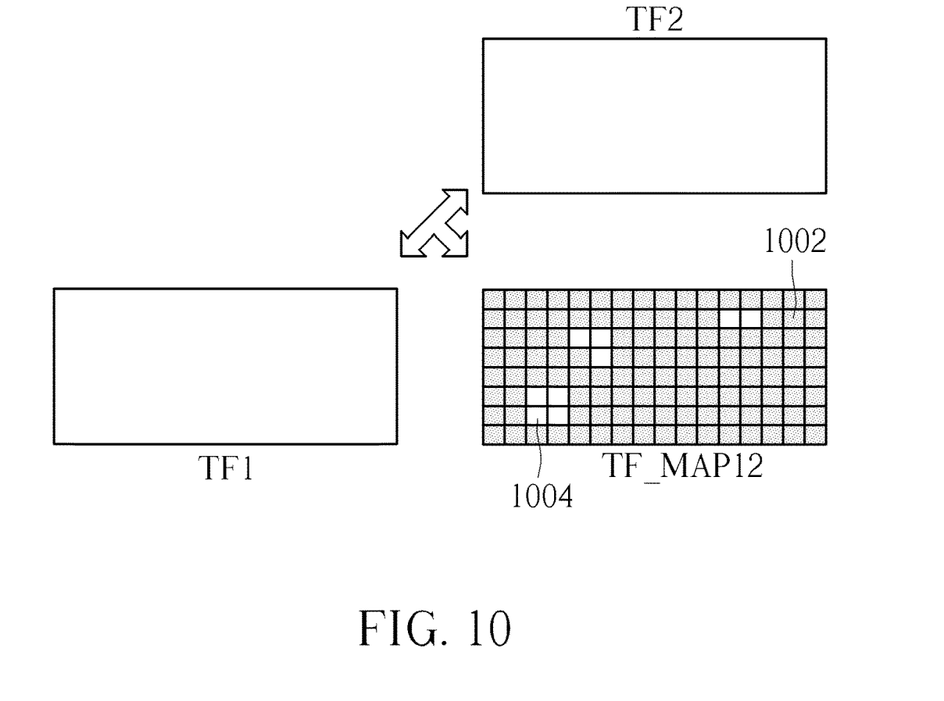
FIG. 10 is a diagram illustrating 2-mode activity indication derived from consecutive frames (e.g. two transformed frames, or one transformed frame and one processed transformed frame) according to an embodiment of the present invention.

FIG. 10 is a diagram illustrating 2-mode activity indication derived from consecutive frames (e.g. two transformed frames, or one transformed frame and one processed transformed frame) according to an embodiment of the present invention. The difference between 2-mode activity indication computation shown in FIGS. 4 and 2-mode activity indication computation shown in FIG. 10 is the frames involved in content activity analysis. As shown in FIG. 10, the content activity analyzer circuit 904 may perform content activity analysis of pixel data in the transformed frames TF1 and TF2 to generate an activity indication map TF_MAP12 that is a 2-mode activity indication map including static pixel data indication 1002 and non-static pixel data indication 1004, where the static pixel data indication 1002 means no motion activity between co-located blocks in transformed frames TF1 and TF2, and the non-static pixel data indication 1004 means motion activity between co-located blocks in transformed frames TF1 and TF2. Alternatively, the transformed frames TF1 and TF2 shown in FIG. 10 may be replaced with a transformed frame (e.g. TF3) and a processed transformed frame (e.g. TF2'), such that a 2-mode activity indication map is derived from content activity analysis of pixel data in the transformed frame and the processed transformed frame.

Figure 11:
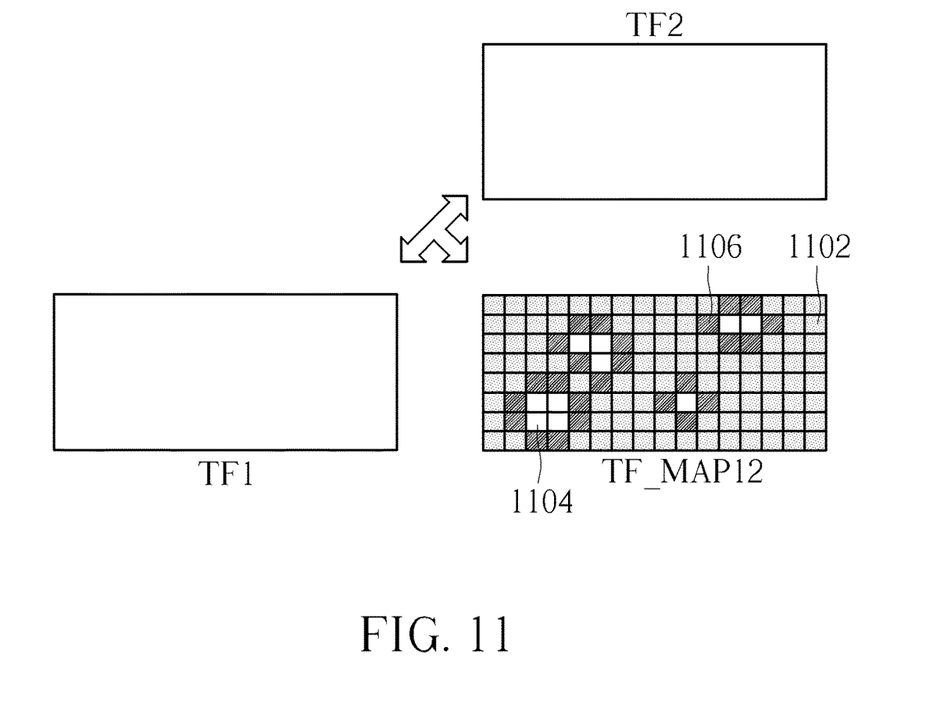
FIG. 11 is a diagram illustrating 3-mode activity indication derived from consecutive frames (e.g. transformed frames, or one transformed frame and one processed transformed frame) according to an embodiment of the present invention.

FIG. 11 is a diagram illustrating 3-mode activity indication derived from consecutive frames (e.g. transformed frames, or one transformed frame and one processed transformed frame) according to an embodiment of the present invention. The difference between 3-mode activity indication computation shown in FIGS. 5 and 3-mode activity indication computation shown in FIG. 11 is the frames involved in content activity analysis. As shown in FIG. 11, the content activity analyzer circuit 904 may perform content activity analysis of pixel data in the transformed frames TF1 and TF2 to generate an activity indication map TF_MAP12 that is a 3-mode activity indication map including static pixel data indication 1102, non-static pixel data indication 1104, and contour of motion (or static) pixel data indication 1106, where the static pixel data indication 1102 means no motion activity between co-located blocks in transformed frames TF1 and TF2, the non-static pixel data indication 1104 means motion activity between co-located blocks in transformed frames TF1 and TF2, and the contour of motion (or static) pixel data indication 1106 means the contour of motion activity between transformed frames TF1 and TF2. Alternatively, the transformed frames TF1 and TF2 shown in FIG. 11 maybe replaced with a transformed frame (e.g. TF3) and a processed transformed frame (e.g. TF2'), such that a 3-mode activity indication map is derived from content activity analysis of pixel data in the transformed frame and the processed transformed frame.

The video encoder circuit 906 is arranged to perform a video encoding process to generate a bitstream output of the video encoding apparatus 900, wherein information derived from the content activity analysis results (e.g. processed frames 707 and activity indication 901) is referenced by the video encoding process. In this embodiment, the video encoder circuit 906 encodes the input frame F1 to generate a first frame bitstream included in the bitstream output. Furthermore, with proper scaling and mapping of the activity indication 901, the video encoder circuit 906 encodes the processed frame F2' according to the activity indication 901 (particularly, activity indication map derived from transformed frames TF2 and TF1), to generate a second frame bitstream included in the bitstream output, encodes the processed frame F3' according to the activity indication 901 (particularly, activity indication map derived from transformed frame TF3 and processed transformed frame TF2'), to generate a third frame bitstream included in the bitstream output, and so forth.

Regarding 2-mode activity indication, it will give two different instructions to the video encoder circuit 906. For example, a plurality of 2-mode activity indication maps are associated with the processed frames 707, respectively. That is, a 2-mode activity indication map associated with a current processed frame to be encoded by the video encoder 906 is referenced by the video encoder 906 to determine how to encode each coding unit (coding block) within the current processed frame. When a coding unit (coding block) in a current processed frame to be encoded is found being associated with the non-static pixel data indication 1004 through proper scaling and mapping, the video encoder circuit 906 may encode the coding unit (coding block) in a typical manner as specified by a coding standard. When a coding unit (coding block) in a current processed frame to be encoded is found being associated with the static pixel data indication 1002 through proper scaling and mapping, the video encoder circuit 906 may force a coded motion vector of the coding unit to zero, or may encode the coding unit with a skip mode. However, these are for illustrative purposes only, and are not meant to be limitations of the present invention.

Regarding 3-mode activity indication, it will give three different instructions to the video encoder circuit 906. For example, a plurality of 3-mode activity indication maps are associated with the processed frames 707, respectively. That is, a 3-mode activity indication map associated with a current processed frame to be encoded by the video encoder 906 is referenced by the video encoder 906 to determine how to encode each coding unit (coding block) within the current processed frame. When a coding unit (coding block) in a current processed frame to be encoded is found being associated with the non-static pixel data indication 1104 through proper scaling and mapping, the video encoder circuit 906 may encode the coding unit (coding block) in a typical manner as specified by a coding standard. When a coding unit (coding block) in a current processed frame to be encoded is found being associated with the static pixel data indication 1102 through proper scaling and mapping, the video encoder circuit 906 may encode the coding unit with a skip mode. When a coding unit (coding block) in a current processed frame to be encoded is found being associated with the contour of motion (or static) pixel data indication 1106 through proper scaling and mapping, the video encoder circuit 906 may force a coded motion vector of the coding unit to zero, or may encode the coding unit without residual information, or may encode the coding unit with a skip mode. However, these are for illustrative purposes only, and are not meant to be limitations of the present invention.

Compared to the video encoder circuit 706 that encodes each coding unit (coding block) of a processed frame in a typical manner as specified by a coding standard, the video encoder circuit 906 that refers to the activity indication 901 to encode each coding unit (coding block) of a processed frame can make a reconstructed frame (decoded frame) at a decoder side have better image quality. It should be noted that the video encoder circuit 906 may be implemented by any suitable encoder architecture. That is, the present invention has no limitations on the encoder architecture employed by the video encoder circuit 906.

Figure 12:
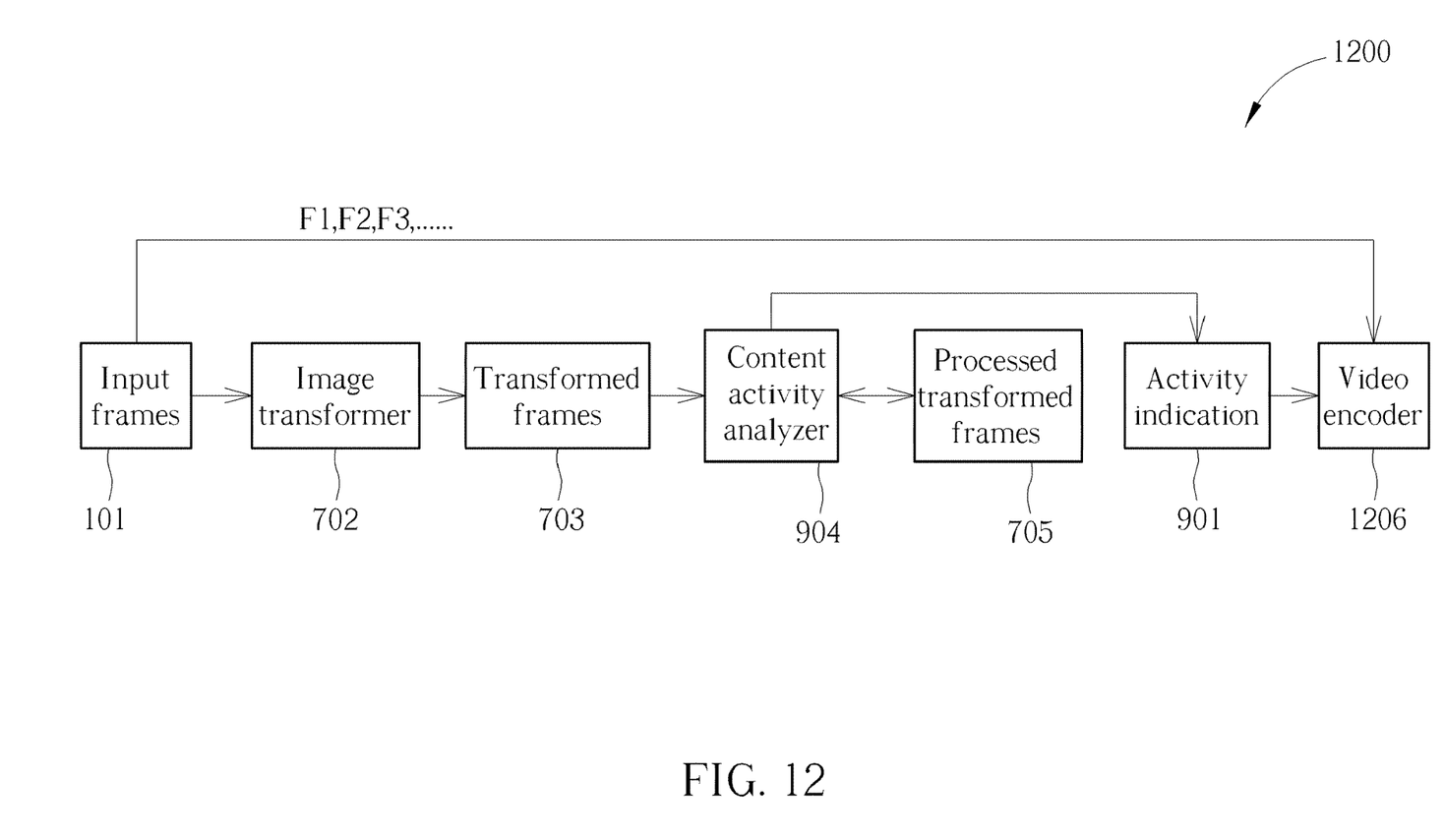
FIG. 12 is a diagram illustrating a sixth video encoding apparatus according to an embodiment of the present invention.

FIG. 12 is a diagram illustrating a sixth video encoding apparatus according to an embodiment of the present invention. The video encoding apparatus 1200 includes a video encoder circuit (labeled by "video encoder") 1206 and the aforementioned image transformer circuit (labeled by "image transformer") 702 and content activity analyzer circuit (labeled by "content activity analyzer") 904. The video encoder circuit 1206 is arranged to perform a video encoding process to generate a bitstream output of the video encoding apparatus 1200, wherein information derived from the content activity analysis results (e.g. activity indication 901) is referenced by the video encoding process. The activity indication 901 may include a plurality of activity indication maps associated with the input frames 101, respectively. In this embodiment, the video encoder circuit 1206 encodes the input frame F1 to generate a first frame bitstream included in the bitstream output. Furthermore, with proper scaling and mapping of the activity indication 901, the video encoder circuit 1206 can encode the rest of the input frames 101 with the aid of the activity indication 901. The video encoder circuit 1206 encodes the input frame F2 according to the activity indication 901 (particularly, activity indication map derived from transformed frames TF2 and TF1), to generate a second frame bitstream included in the bitstream output, encodes the input frame F3 according to the activity indication 901 (particularly, activity indication map derived from transformed frame TF3 and processed transformed frame TF2'), to generate a third frame bitstream included in the bitstream output, and so forth. It should be noted that the video encoder circuit 1206 maybe implemented by any suitable encoder architecture. That is, the present invention has no limitations on the encoder architecture employed by the video encoder circuit 1206.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video encoding apparatus comprising:
a content activity analyzer circuit, arranged to apply a content activity analysis process to a plurality of consecutive frames, to generate a plurality of content activity analysis results, wherein the plurality of consecutive frames are derived from a plurality of input frames of the video encoding apparatus, and the content activity analysis process performed by the content activity analyzer circuit comprises:
deriving a first content activity analysis result included in the plurality of content activity analysis results according to a first frame and a second frame included in the plurality of consecutive frames, wherein the first content activity analysis result comprises a processed frame distinct from any of the first frame and the second frame; and
deriving a second content activity analysis result included in the plurality of content activity analysis results according to a third frame and the processed frame, wherein the third frame is included in the plurality of consecutive frames; and
a video encoder circuit, arranged to perform a video encoding process to generate a bitstream output of the video encoding apparatus, wherein information derived from the plurality of content activity analysis results is referenced by the video encoding process;
wherein the second frame is between the first frame and the third frame; the processed frame is generated by replacing static pixel data in the second frame that are identified by the content activity analysis process with processed pixel data, where the processed pixel data are static pixel data in the first frame, or the processed data are generated by applying an arithmetic operation to pixel data in the first frame and the second frame; and the processed frame is used as a replacement of the second frame for deriving the second content activity analysis result, and the content activity analyzer circuit derives the second content activity analysis result through performing content activity analysis of pixel data of the third frame and the processed frame to identify static pixel data in the third frame.

2. The video encoding apparatus of claim 1, wherein the plurality of consecutive frames received by the content activity analyzer circuit are the plurality of input frames of the video encoding apparatus, respectively.

3. The video encoding apparatus of claim 2, wherein the video encoding process performed by the video encoder circuit comprises:
encoding the first frame to generate a first frame bitstream included in the bitstream output; and
encoding the processed frame to generate a second frame bitstream included in the bitstream output.

4. The video encoding apparatus of claim 2, wherein the first content activity analysis result further comprises activity indication, the activity indication comprises static pixel data indication and non-static pixel data indication.

5. The video encoding apparatus of claim 4, wherein in response to a coding unit being associated with the static pixel data indication, the video encoder circuit is arranged to:
force a coded motion vector of the coding unit to zero; or
encode the coding unit with a skip mode.

6. The video encoding apparatus of claim 4, wherein the activity indication further comprises contour of motion pixel data indication.

7. The video encoding apparatus of claim 6, wherein in response to a coding unit being associated with the contour of motion pixel data indication, the video encoder circuit is arranged to:
force a coded motion vector of the coding unit to zero; or
encode the coding unit without residual information; or
encode the coding unit with a skip mode.

8. The video encoding apparatus of claim 4, wherein the video encoding process performed by the video encoder circuit comprises:
encoding the first frame to generate a first frame bitstream included in the bitstream output; and
encoding the processed frame according to the activity indication, to generate a second frame bitstream included in the bitstream output.

9. The video encoding apparatus of claim 4, wherein the video encoding process performed by the video encoder circuit comprises:
encoding the first frame to generate a first frame bitstream included in the bitstream output; and
encoding the second frame according to the activity indication, to generate a second frame bitstream included in the bitstream output.

10. The video encoding apparatus of claim 1, further comprising:
an image transformer circuit, arranged to apply an image transform process to the plurality of input frames of the video encoding apparatus, to generate a plurality of transformed frames as the plurality of consecutive frames;
wherein the first frame, the second frame, and the third frame included in the plurality of consecutive frames are derived from a first input frame, a second input frame, and a third input frame included in the plurality of input frames, respectively.

11. The video encoding apparatus of claim 10, wherein the first content activity analysis result further comprises another processed frame distinct from the processed frame, and the video encoding process performed by the video encoder circuit comprises:
encoding the first input frame to generate a first frame bitstream included in the bitstream output; and
encoding said another processed frame to generate a second frame bitstream included in the bitstream output.

12. The video encoding apparatus of claim 10, wherein the first content activity analysis result further comprises activity indication, the activity indication comprises static pixel data indication and non-static pixel data indication.

13. The video encoding apparatus of claim 12, wherein in response to a coding unit with the static pixel data indication, the video encoder circuit is arranged to encode the coding unit with a skip mode.

14. The video encoding apparatus of claim 12, wherein the activity indication further comprises contour of motion pixel data indication.

15. The video encoding apparatus of claim 14, wherein in response to a coding unit with the contour of motion pixel data indication, the video encoder circuit is arranged to:
force a coded motion vector of the coding unit to zero; or
encode the coding unit without residual information; or
encode the coding unit with a skip mode.

16. The video encoding apparatus of claim 12, wherein the first content activity analysis result further comprises another processed frame distinct from the processed frame, and the video encoding process performed by the video encoder circuit comprises:

encoding the first input frame to generate a first frame bitstream included in the bitstream output; and encoding said another processed frame according to the activity indication, to generate a second frame bitstream included in the bitstream output.

17. The video encoding apparatus of claim 12, wherein the video encoding process performed by the video encoder circuit comprises:

encoding the first input frame to generate a first frame bitstream included in the bitstream output; and encoding the second input frame according to the activity indication, to generate a second frame bitstream included in the bitstream output.

18. A video encoding method comprising:

applying a content activity analysis process to a plurality of consecutive frames for generating a plurality of content activity analysis results, wherein the plurality of consecutive frames are derived from a plurality of input frames, and the content activity analysis process comprises:

deriving a first content activity analysis result included in the plurality of content activity analysis results according to a first frame and a second frame included in the plurality of consecutive frames, wherein the first content activity analysis result comprises a processed frame distinct from the second frame; and deriving a second content activity analysis result included in the plurality of content activity analysis results according to a third frame and the processed frame, wherein the third frame is included in the plurality of consecutive frames and the processed frame; and performing a video encoding process to generate a bitstream output, wherein information derived from the plurality of content activity analysis results is referenced by the video encoding process;

wherein the second frame is between the first frame and the third frame; the processed frame is generated by replacing static pixel data in the second frame that are identified by the content activity analysis process with processed pixel data, where the processed pixel data are static pixel data in the first frame, or the processed data are generated by applying an arithmetic operation to pixel data in the first frame and the second frame; and the processed frame is used as a replacement of the second frame for deriving the second content activity analysis result, and the second content activity analysis result is derived through performing content activity analysis of pixel data of the third frame and the processed frame to identify static pixel data in the third frame.

* * * * *